(No Model.) 2 Sheets—Sheet 2.
M. GEHRE.
APPARATUS FOR DETERMINING THE AMOUNT OF WATER IN STEAM.
No. 465,321. Patented Dec. 15, 1891.
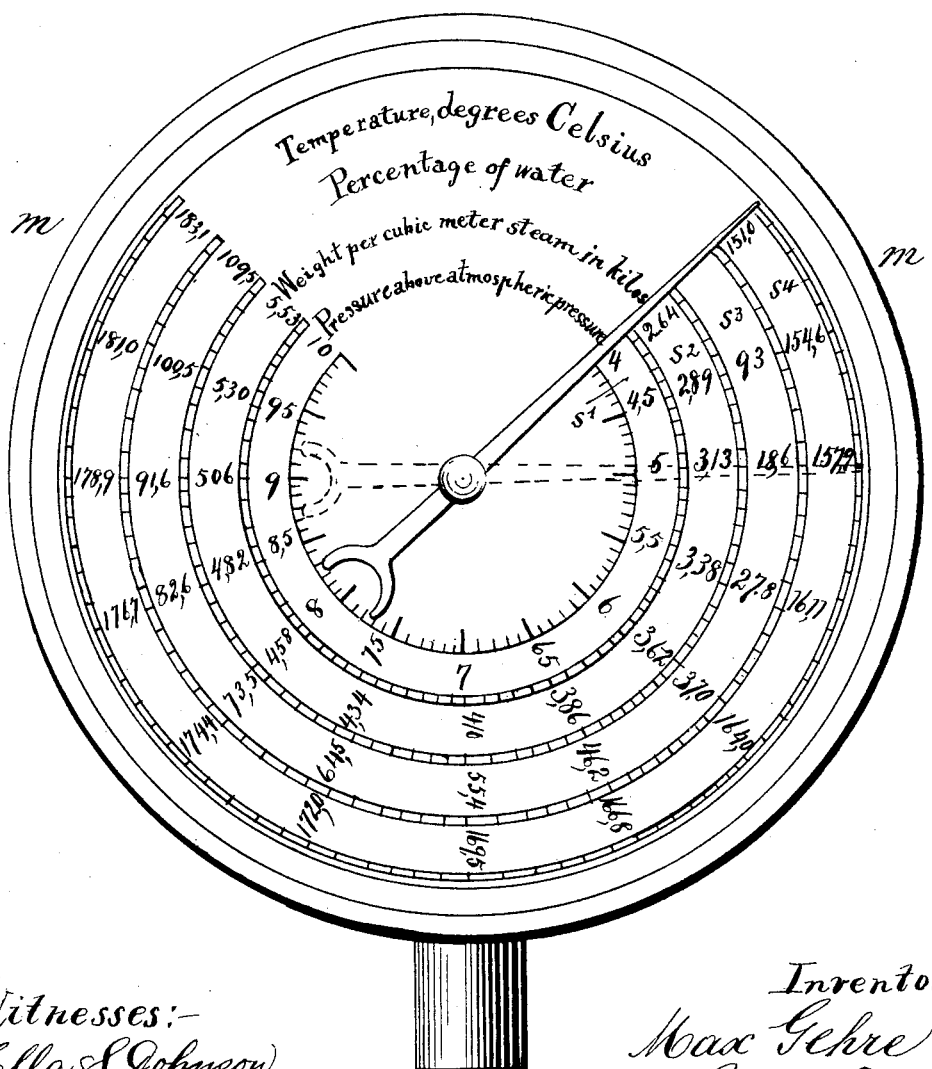
Fig. III.
Witnesses:—
Ella S. Johnson
P. H. Sommers
Inventor:
Max Gehre
pr Henry Orth
atty.

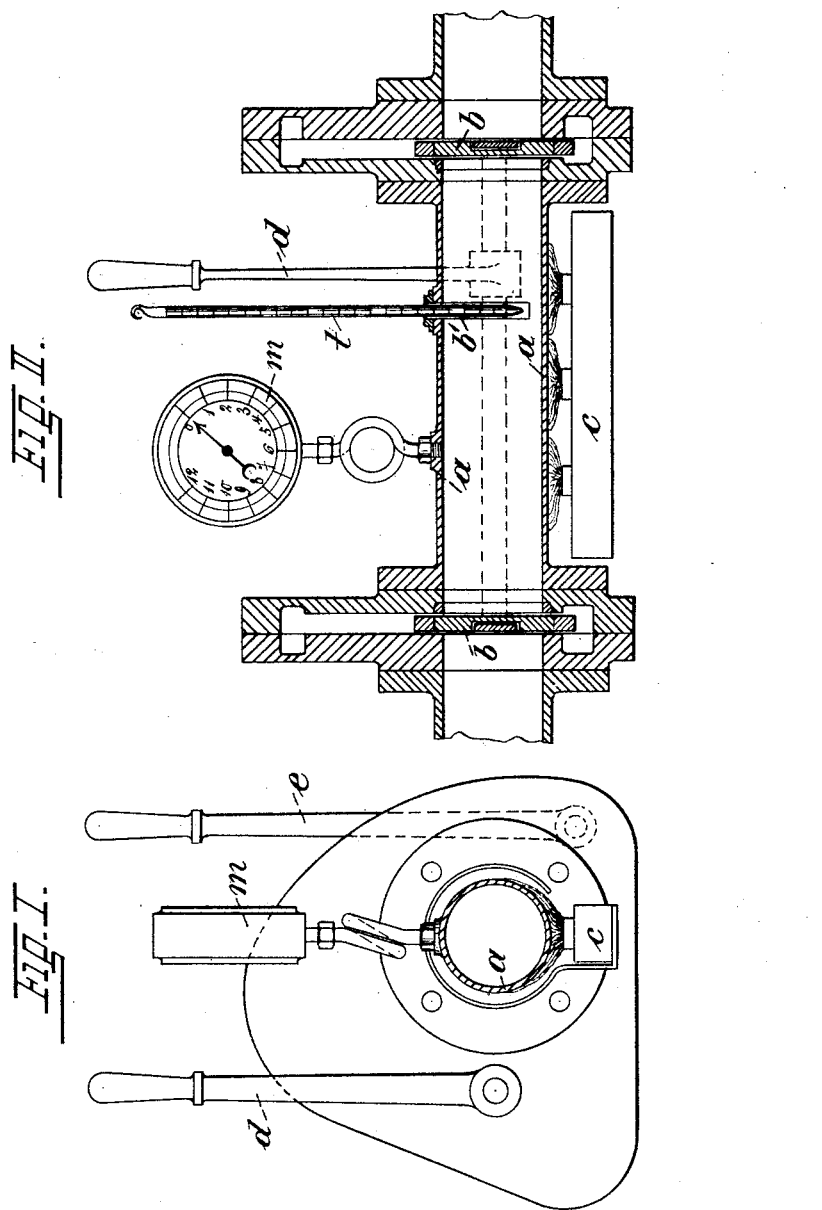

United States Patent Office.

MAX GEHRE, OF RATH, GERMANY.

APPARATUS FOR DETERMINING THE AMOUNT OF WATER IN STEAM.

SPECIFICATION forming part of Letters Patent No. 465,321, dated December 15, 1891.

Application filed February 5, 1890. Serial No. 339,335. (No model.) Patented in England December 24, 1889, No. 20,755; in Belgium December 24, 1889, No. 88,976; in France December 24, 1889, No. 202,789; in Italy December 31, 1889, XXIII, 26,752 and LII, 492; in Germany September 24, 1890, No. 52,327, and in Austria-Hungary October 7, 1890, No. 22,339 and No. 44,384.

*To all whom it may concern:*

Be it known that I, MAX GEHRE, engineer, a subject of the King of Prussia, residing at Rath, near Düsseldorf, Prussia, German Empire, have invented certain new and useful Improvements in Steam-Calorimeters, (for which I have obtained Letters Patent in Great Britain, No. 20,755, dated December 24, 1889; in Germany, No. 52,327, dated September 24, 1890; in Belgium, No. 88,976, dated December 24, 1889; in France, No. 202,789, dated December 24, 1889; in Italy, Vol. XXIII, 26,752, and Vol. LII, 492, dated December 31, 1889; and in Austria-Hungary, Nos. 22,339 and 44,384, dated October 7, 1890;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates to apparatus for determining the quantity of water in steam.

The operations or calculations necessary to determine the quantity of water in steam, as well as the means employed for obtaining the data upon which such calculations are based and heretofore proposed, are not only very tedious and complicated, but are more or less unreliable.

It is well known in steam engineering that the temperature and pressure of saturated steam have a fixed relation to each other, and these fixed relations are found in the tables of nearly all good works on steam-engineering. The weight of saturated steam or the weight of the water held in saturated steam at given pressures has also been determined, and may likewise be found in the hand or text books on steam-engineering, my invention being based upon the difference between the weight of saturated steam at a given pressure and the weight of such steam at the pressure it would have at the moment of transition from saturation to dry steam, or after all the water held thereby has been evaporated. The operation involves, therefore, a simple subtraction and an equally-simple apparatus for obtaining the necessary data, said apparatus consisting, essentially, of a vessel for confining the same, a heater for heating said vessel for the purpose of superheating the steam, a thermometer under the influence of the confined steam, and a manometer which for convenience is provided with weight and temperature scales corresponding with its pressure-scale, said weight and temperature scales indicating the weight and temperature of saturated steam at given pressures. The temperature-scale could be dispensed with but for the fact that it facilitates the determination of the transition of the steam from wet to dry in conjunction with the thermometer. In view of the fixed relations of temperature and pressure in wet steam the thermometer-indications will correspond with the manometer-scale at different pressures so long as moisture is contained in the steam; but the moment the moisture is evaporated and the steam becomes dry these indications will cease to correspond. The thermometer will indicate a higher temperature than that indicated by the manometer temperature-scale at certain pressures, and this variation shows the transition from wet to dry. Now, if the weight indicated by the weight-scale of the manometer is noted down at the moment of transition, as indicated by the variation between the thermometer and the temperature-scale of the manometer and the weight of the saturated steam at the start deducted therefrom the difference will be the amount of water held in the steam. Thus, for example, as shown in Figure III in full lines, if the initial pressure of the saturated steam confined in the vessel above referred to is four atmospheres over pressure its temperature will be 151° centigrade and its weight 2.64 kilos. If now the steam confined in the vessel is superheated, the temperature and pressure will gradually rise, and this rise will be simultaneously indicated by the thermometer and manometer as the hand or index travels over the scale of the latter until the point of transition is reached, when all the moisture will have been converted into steam. At this moment the thermometer will indicate a higher temperature than that indicated by the manometer-scale; and if the transition from wet to dry takes place at a pressure of, say, five atmospheres the weight of saturated steam at such a pressure will be 3.13 kilos, as indicated by the index in dotted lines in said Fig. 3. It therefore simply remains to deduct the initial weight 2.64 kilos from the weight of saturated steam at a pressure of five atmospheres—namely, 3.13 kilos—and the difference will be 0.49 kilos. Hence if 2.64 kilos of steam held 0.49 kilos of water one kilo of steam holds $\frac{0.49}{2.64} = 0.186$, or 18.6 per cent.

Referring now to the drawings, Fig. I is an end view; Fig. II, a longitudinal vertical sectional elevation of an apparatus adapted for use in carrying my invention into practical effect; and Fig. III is an elevation of the manometer, on an enlarged scale, showing the quadruple scale $s'$ $s^2$ $s^3$ $s^4$, indicating, respectively, various pressures of saturated steam, the weight in kilograms per cubic meter of steam under said pressures, the percentage of water in steam of a given pressure and weight, and the temperature of saturated steam of a given pressure.

The apparatus consists of a cylinder $a$, interposed in a steam-duct leading from the generator and having at each end a valve-port and a seat for a valve $b$, said two valves being respectively connected with the levers $d$ and $e$, and are adapted to hermetically close the valve-ports. The cylinder is provided with the quadruple-scale manometer $m$, hereinbefore described, and with a thermometer $t$, that dips into a housing or casing $b'$, secured to said cylinder and projecting into the same. The cylinder $a$, as well as the housing $b'$, should be constructed of as thin sheet metal as will resist the pressures to which they may be subjected.

The heating apparatus may be of any desired form or construction, according to the combustible available. In the drawings I have shown a reservoir $c$ for a liquid combustible arranged below the cylinder intermediate of the valved ends or heads thereof and provided with a plurality of burners. Where gas or other gaseous combustibles are available a pipe provided with burners and connected with the source of supply may be used.

The operation of the apparatus will be readily understood from what has been said in the description of the method, and need therefore not be further described.

Having now particularly described my invention, what I claim, and desire to secure by Letters Patent, is—

1. The combination, with a steam-conduit, of an apparatus for determining the quantity of water in steam, comprising a vessel interposed in said conduit, suitable valves for confining a body of steam within the vessel, a heater for heating the confined steam, a thermometer dipping into the vessel, and a manometer in communication therewith, for the purpose set forth.

2. An apparatus for ascertaining the quantity of water in steam, comprising a vessel for heating the wet steam, a temperature-indicator, and a pressure-indicator provided with a temperature-scale corresponding with the pressure-scale and with a scale indicating the weight of wet steam corresponding with the temperature and pressure scales, as set forth.

3. An apparatus for ascertaining the quantity of water in steam, comprising a vessel for heating the wet steam, a thermometer dipping into the same, and a manometer having the quadruple scale $s'$ $s^2$ $s^3$ $s^4$, as set forth.

In testimony whereof I affix my signature in presence of two witnesses.

MAX GEHRE. [L. S.]

Witnesses:
D. J. PARTELLO,
F. H. THOMAS.